Patented Feb. 15, 1949

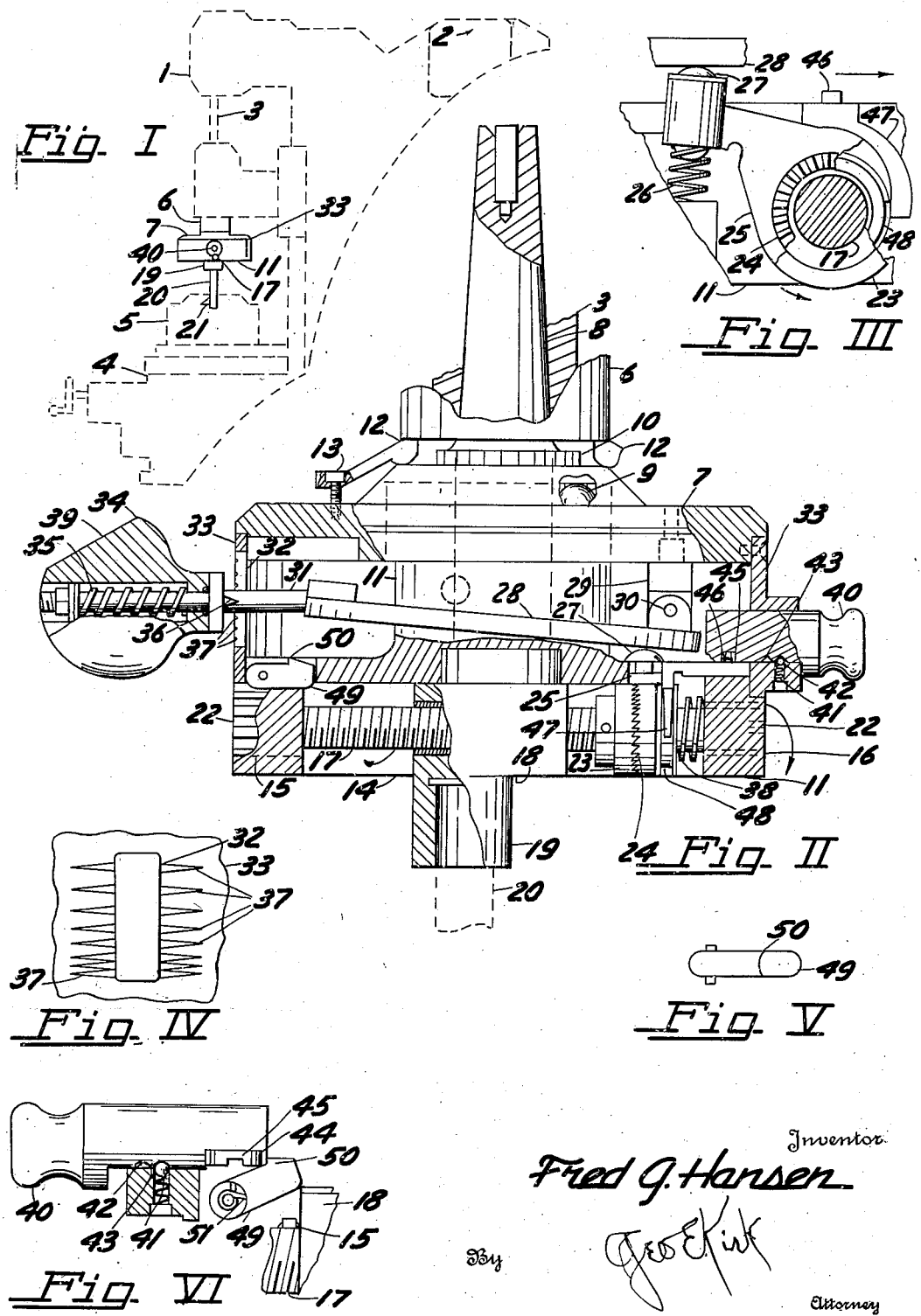

2,461,732

UNITED STATES PATENT OFFICE 2,461,732

MACHINE TOOL WORKING HEAD

Fred G. Hansen, Toledo, Ohio

Application April 29, 1946, Serial No. 665,818

2 Claims. (Cl. 77—58)

This invention relates to an accessory or attachment for cooperation with the rotary element of a power driven machine tool for controlling the radial progress of the tool, as in metal cutting.

This invention has utility when incorporated as a boring head adapted to be rotated by a machine tool spindle, and having automatic feed or progress determining means actuable from the rotation rate of the tool carried by the head for changing the diameter of transit for such tool.

Referring to the drawings:

Fig. 1 shows an embodiment of the invention as mounted on the spindle of a vertical type boring machine, the machine being in outline in dotted lines, and partly broken away;

Fig. 2 is an enlarged view, with parts broken away, of the attachment and the adjustable control for varying the radial position of the tool in operation;

Fig. 3 is a fragmentary detail of the actuator for the feed screw as locating the tool;

Fig. 4 is a detail view of the positioning scale or feed control graduations for determining the rate of progress of the tool, say in the number of cuts or transits per unit of radial distance change;

Fig. 5 is a detail view in plan of the kick-out arm, mounted in the non-rotary or stationary part of the head, and adapted to be thrust up, or lifted at its inner end by the radially traveling nut on the feed screw, which nut carries the cutting tool; and Fig. 6 shows the kick-out arm of Fig. 5, but here in side elevation, and as actuated by the nut, for shifting the feed stop knob radially outward to a held position, so that in the succeeding rotation the yoke clears the radially toothed member from rotating the threaded feed shaft or screw.

A vertical boring machine 1 has a motor 2 connected thru various gearings and controls to rotate a vertical spindle 3 in opposition to an adjustable table 4 upon which work 5 may be located. The spindle 3 operates in a non-rotary or fixed guide sleeve 6.

The accessory or unit of the head of this disclosure comprises a non-rotary housing 7 thru which a spindle element or rotary extension 8 may extend, having anti-friction lateral bearing 9 in the housing 7. Adjusting ring 10 completes the assembly of the bearing 9 in the upper housing section 7 and a lower major housing section 11. Between the lower end of the stationary sleeve 6 and the top of the minor or upper housing section 7 is interposed friction lock or wedge means 12, adapted to be adjusted thru screws 13 engaging the section 7, for establishing and maintaining a non-rotative assembly for the housing section 7.

The relatively rotatable lower housing section 11 is fixed with the spindle 8 and has diametrically extending therebelow a way 14 having end bearings 15, 16, for a feed screw 17. Intermediate the bearings 15, 16, in the way 14, there is a feed nut 18 on the screw 17. Depending from this nut 18 is a socket seat 19 for a tool bar 20, adapted to carry metal cutting blades 21, adapted for drilling, boring, under cutting, grooving, facing, in a full range for tool radial travel in or out in its circular orbits of operation. Key openings 22 in the opposite ends of the feed screw 17 permit the insertion of a tool and its operation for locating true center, or a desired off-center position for maintained location for the cutting tool during the spindle rotation.

Under the invention herein, this location may be automatically shifted at a desired rate constant. To this end, an adjustable coupling is fixed on the screw 17 to one side of the nut 18 and in the way 14, being an annularly toothed member 23, the radial notches of which are complementary to teeth 24 of an arm 25, loosely mounted on the shaft 17.

A compression helical spring 26 maintains the free end of the arm 25 upward to have a bearing 27 ride against the underside of an adjustable control ring 28. Depending from the underside of the fixed housing section 7 is a bracket 29 providing a pivot bearing 30 on an ear from the upper side, near one edge, of the ring 28. Radially from the remote side of this non-rotary tiltable control ring 28 is an arm 31 extending thru an opening 32 in a depending skirt 33 fixed with the housing 7 and about and over the lower relatively rotary section 11. Upon the protruding portion of the rod or arm 31 is a knob or grip 34 normally thrust inward by a compression helical spring 35 to have diametrical knife edge projections 36 thrust into scale or graduation seats 37 extending from the opposite sides of the opening 32.

With a ⅝" diameter feed screw 17 at 20 threads per inch providing a radial travel of 2 inches for the socket 19, the lowermost seat pair 37 at the opening 32 may be for locating the ring 28 untilted or horizontal. This means that in each rotation of the spindle section 8 and the head section 11 keyed to rotate therewith, the bearing 27 has no up nor down movement relatively to the plane in which the screw 17 is traveling in its position crosswise of the spindle section 8. Accordingly there is no rocking of the arm 25. In a layout developed under the schedule of dimensions disclosed, the succeeding upward pairs of seats 37, when there be 50 radial teeth in the member 23 to coact with a similar number of complementary teeth 24 of the arm 25, is that each step upward may mean .001 inch feed distance for the cutting tool 21, herein shown as up to .007 inch. The spring 26 effects the idle or upthrust for the arm 25 to the high region of the ring 28. The rotation of the member 11, carries the screw 17 and the arm 25 along the underside of the ring 28 to be thrust down and thru the mesh relation holding of compression helical spring 38 on the shaft 17, the rock distance of the arm 25 causes the teeth 23, 24, as in register to cause the fractional turn for the shaft 17.

From the foregoing, it is to be noted that the pull handle or grip 34, which may have a flat upper side portion 39 to bear a suggestive notation to the machine operator to guide in the operation of the control, at each rotation, thru the intermittent grip mechanism effects a step-by-step feed rate. The feed may be in or out as to operation, according to the thread pitch and direction. The spring 38 allows the free recovery for the arm 25, so that upon the next rotation, there is the gradual descent from the high point to the low in effecting the feed step rotation for the screw 17.

Upon completion of a feed cycle, a knob 40 may be pulled radially outward, to have a ball spring stop 41 retracted from a seat 42 and to lodge in a seat 43. This means that a spread end way 44 having a restricted medial section 45, as carried by the knob 40, serves to engage an upstanding pin 46, in its next rotation, and pull such pin 46 and a fork 47 fixed therewith, outward. The fork 47 is in a grooved collar 48 fixed with the intermittent grip toothed rockable member 24, 25, and thus pulls the teeth 24 against the resistance of the spring 38 out of mesh with the teeth 23, to be so held by the spring stop 41 in the seat 43. This is a manual control disconnecting the automatic feed, so that the operator may thrust a tool into a key seat 22 and reset the nut 18 and the tool 21 carried thereby.

For automatic stop operation, the nut 18 in the way 14 rides under a trigger 49 carried by the member 11, and accordingly turning with the spindle section 8. The knob 40 in the non-rotary skirt 33, has the inner end of the knob 40, thrust outward by the uplifted ledge 50 of the trigger 49, so that the knob 40 is thrust outward from the spring seat 42 to have its seat 43 engaged by the stop 41. Accordingly, as so held, the automatically outwardly thrust knob 40, as so located by the feed nut 18, now pulls the fork 47 to disconnect the intermittent grip feed. A torsion spring 51 swings the trigger 49 down as the nut 18 is cleared therefrom.

What is claimed and it is desired to secure by Letters Patent is:

1. A working head accessory for a machine tool having a sleeve, a rotatable spindle in the sleeve provided with a seat, and an opposing work table adjustable toward and from the spindle and sleeve; the combination of a spindle element extension in the seat, a lateral bearing for the extension, a housing for the bearing comprising a first section adjustably fixed with relation to the sleeve and a complemental relatively rotatable second section fixed relative to the extension, said housing providing a chamber between the sections, a ring in the chamber extending transversely to the axis-extended of the spindle and pivoted to one of the housing sections, a tilt adjustment device for the ring as to the housing in which pivoted, a tool holder having a nut, a feed screw for the nut rotatably mounted in the other housing section from that mounting the ring, and an adjustable coupling between the ring and screw for progressing the holder radially relative to the spindle axis.

2. A working head accessory for a machine tool having a sleeve, a rotatable spindle in the sleeve provided with a seat, and an opposing work table adjustable toward and from the spindle and sleeve; said accessory comprising the combination of a spindle element extension in the seat, a lateral bearing for the extension, a housing for the bearing including a first section adjustably attachably fixed with the sleeve and a complemental relatively rotatable second section fixed with the extension, said housing providing a chamber about the extension and between the sections, a ring in the chamber pivoted to the first housing section, a tilt adjustment device for the ring as to the first housing section, a tool holder having a nut, a feed screw thru the nut and rotatably mounted in the second housing section, and an adjustable coupling coacting between the ring and screw for progressing the holder radially relatively to the spindle axis.

FRED G. HANSEN.

REFERENCES CITED

The following references are of record in the file of this patent:

UNITED STATES PATENTS

| Number | Name | Date |
|---|---|---|
| 836,715 | Smith | Nov. 27, 1906 |
| 2,079,197 | Bergman | May 4, 1937 |
| 2,166,852 | Weiss | July 18, 1939 |